United States Patent
Cross et al.

(10) Patent No.: US 8,600,033 B1
(45) Date of Patent: Dec. 3, 2013

(54) PROVIDING BUSINESS LISTINGS BASED ON LOCATIONS OF PREVIOUSLY PROVIDED LISTINGS

(75) Inventors: Karen M. Cross, Mountain View, CA (US); Andrea Klein, Mountain View, CA (US); Anne K. Sullivan, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1470 days.

(21) Appl. No.: 11/617,104

(22) Filed: Dec. 28, 2006

(51) Int. Cl.
*H04M 3/42* (2006.01)

(52) U.S. Cl.
USPC .................. 379/218.01; 379/207.12

(58) Field of Classification Search
USPC ......... 379/218.01, 201.01, 207.12; 455/456.2
See application file for complete search history.

(56) References Cited

U.S. PATENT DOCUMENTS

| 7,191,319 | B1* | 3/2007 | Dwyer et al. | 712/228 |
| 7,398,271 | B1* | 7/2008 | Borkovsky et al. | 1/1 |
| 2003/0231755 | A1* | 12/2003 | Akhteruzzaman et al. | 379/218.01 |
| 2005/0198068 | A1* | 9/2005 | Mukherjee et al. | 707/104.1 |
| 2005/0255861 | A1* | 11/2005 | Wilson et al. | 455/456.2 |
| 2006/0143242 | A1* | 6/2006 | Hara | 707/203 |
| 2007/0067451 | A1* | 3/2007 | Oshiba | 709/224 |
| 2007/0072591 | A1* | 3/2007 | McGary et al. | 455/414.1 |

* cited by examiner

*Primary Examiner* — Amal Zenati
(74) *Attorney, Agent, or Firm* — Perkins Coie LLP

(57) ABSTRACT

A system may receive a request for a business listing, and search a database to identify a set of business listings based on the request. The system may also identify at least one previously requested business or residential listing, and select and/or present one or more of the business listings based on a geographic location associated with the at least one previously requested business or residential listing.

37 Claims, 9 Drawing Sheets

PROVIDING BUSINESS LISTINGS BASED ON LOCATIONS OF PREVIOUSLY PROVIDED LISTINGS

BACKGROUND

Interactive voice response (IVR) systems permit a person to interact with a computer system. Oftentimes, a person contacts an IVR system by calling a telephone number associated with the IVR system. The IVR system provides a series of prompts to the person and receives a number of responses to the prompts from the person. The IVR system may permit the person to speak his responses, in which case, the IVR system may use voice recognition techniques to determine what the person said.

One embodiment of an IVR system includes a directory assistance system that receives calls requesting business listings, performs searches for business listings based on the received calls, and provides business listings as search results. One problem with existing directory assistance systems is that these systems treat each call as an independent call—independent of any previously received calls.

SUMMARY

According to one aspect, a method may include receiving a request for a business listing; searching a database to identify a set of business listings based on the request; identifying at least one previously requested business listing; selecting one of the business listings in the set of business listings based on a geographic location associated with the at least one previously requested business listing; and presenting the selected business listing.

According to another aspect, a method may include receiving a request for a business listing; searching a database to identify a set of business listings based on the request; identifying at least one previously requested business listing; and presenting one or more of the business listings in the set of business listings based on a geographic location associated with the at least one previously requested business listing.

According to yet another aspect, a system, implemented within a directory assistance device and/or a caller device, may include means for receiving, from a caller, a request for a business listing; means for identifying a set of business listings based on the request; means for identifying a previously requested business listing associated with the caller; means for selecting one of the business listings in the set of business listings based on a geographic location associated with the previously requested business listing; and means for presenting the selected business listing.

According to a further aspect, a system, implemented within a directory assistance device and/or a caller device, may include means for receiving, from a caller, a request for a business listing; means for identifying a set of business listings based on the request; means for identifying a previously requested business listing associated with the caller; and means for presenting one or more of the business listings in the set of business listings based on a geographic location associated with the previously requested business listing.

According to another aspect, a system may include a memory to store one or more previously requested business listings associated with a caller, and a processor to receive, from the caller, a request for a business listing, identify a set of business listings based on the request, select one of the business listings in the set of business listings based on a geographic location associated with at least one of the one or more previously requested business listings in the memory, and present the selected business listing.

According to a further aspect, a system may include a memory to store one or more previously requested business listings associated with a caller, and a processor to receive, from the caller, a request for a business listing, identify a set of business listings based on the request, and present one or more of the business listings in the set of business listings based on a geographic location associated with at least one of the one or more previously requested business listings in the memory.

According to another aspect, a method may include receiving a request for a business listing; searching a database to identify a set of business listings based on the request; identifying at least one previously requested business or residential listing; and presenting one or more of the business listings in the set of business listings based on a geographic location associated with the at least one previously requested business or residential listing.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Overview

Figure 1:
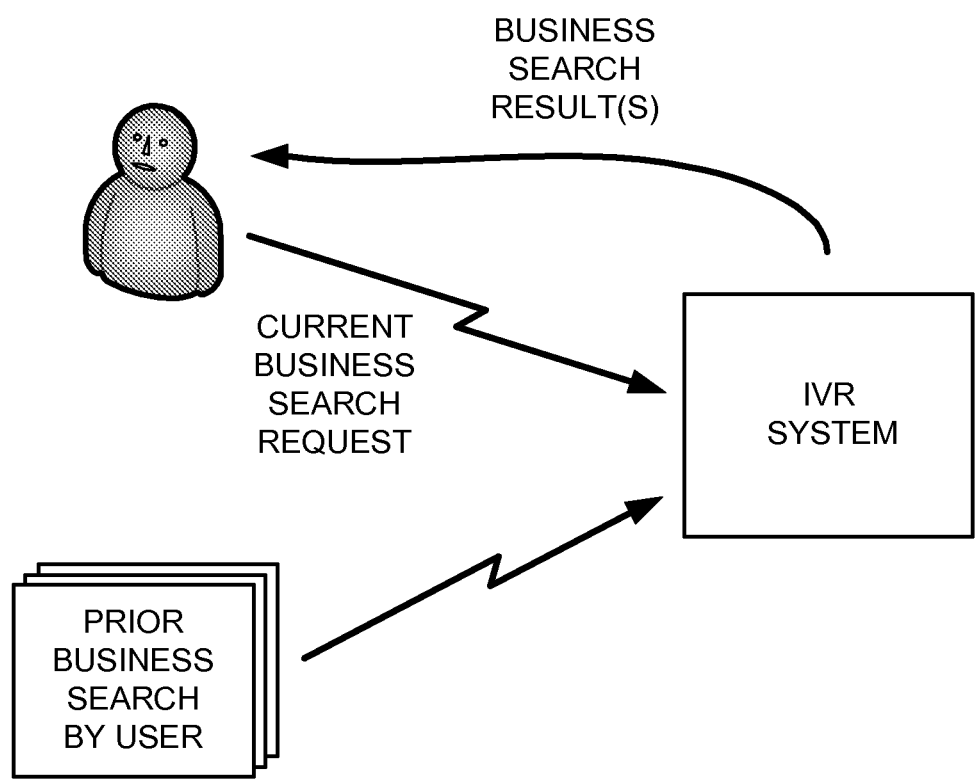
FIG. 1 is an exemplary diagram illustrating a concept described herein.

Implementations described herein may provide business listings based on location information associated with previously requested business listings. FIG. 1 is an exemplary diagram illustrating a concept described herein. As shown in FIG. 1, an exemplary system may include an IVR system. A user may interact with the IVR system to obtain business listing information. The user may, for example, provide information to the IVR system and receive information from the IVR system.

The user may contact the IVR system and request information regarding a particular business listing. For example, the user may send a current business search request. The IVR system may process the current business search request based on information regarding one or more prior business searches by the user. For example, the IVR system may use information regarding the geographic location associated with a prior business search result to influence the generation (e.g., selection and/or presentation) of one or more business search results to provide to the user. This operates under the assumption that users may be interested in business search results that are geographically close to the location of a prior business search.

In the description to follow, an IVR system will be described in terms of a directory assistance system. It should be understood, however, that the description equally applies to other types of interactive systems (whether voice-based or not). In the context of a directory assistance system, implementations described herein may generate future business listing information based on geographic locations associated with one or more previously requested business listings. These implementations are particularly useful in the situation where a caller requests a listing associated with a business attribute (e.g., a category) or a listing associated with a business that has more than one location (e.g., franchise businesses or business chains).

Exemplary Network Configuration

Figure 2:
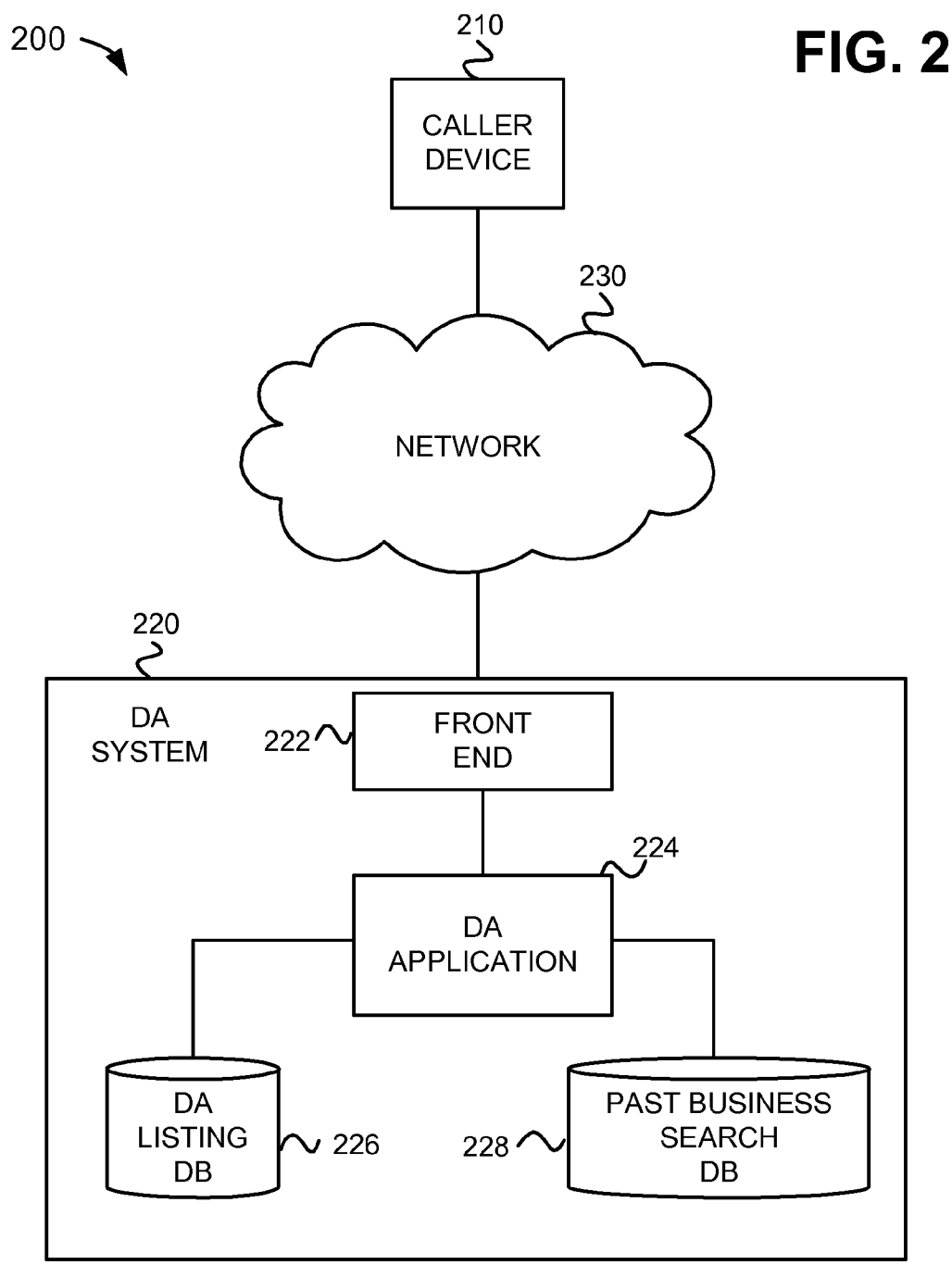
FIG. 2 is an exemplary diagram of a network in which systems and methods described herein may be implemented.

FIG. 2 is an exemplary diagram of a network 200 in which systems and methods described herein may be implemented. Network 200 may include a caller device 210 and a directory assistance (DA) system 220 connected via a network 230. A single caller device 210 and directory assistance system 220 have been illustrated as connected to network 230 for simplicity. In practice, there may be more caller devices 210 and/or directory assistance systems 220.

Caller device 210 may include any type of communication or computation device, such as a telephone, a personal computer, a personal digital assistant (PDA), or a laptop. Caller device 210 may include a processor and a memory that may store instructions executable by the processor to perform certain functions. For the description to follow, assume that caller device 210 requests directory assistance from directory assistance system 220. This request may take a number of different forms. For example, caller device 210 may make a voice call to directory assistance system 220, may send a text message (e.g., a short message service (SMS) message) to directory assistance system 220, or may interact with directory assistance system 220 via a web interface.

Directory assistance system 220 may include an interactive system that provides services to caller device 210. In one implementation, directory assistance system 220 may provide directory assistance services. In this manner, directory assistance system 220 may receive a call from caller device 210 and either provide caller device 210 with listing information regarding one or more business listings, connect caller device 210 to a device associated with the one or more business listings, provide caller device 210 with directions (e.g., driving, walking, public transportation, etc. directions) to a location associated with the one or more business listings, and/or provide caller device 210 with a map that may illustrate the location associated with the one or more business listings.

As shown in FIG. 2, directory assistance system 220 may functionally include a front end 222, a directory assistance (DA) application 224, a directory assistance (DA) listing database (DB) 226, and a past business search database (DB) 228. While FIG. 2 shows directory assistance application 224, directory assistance listing database 226, and past business search database 228 as separate from front end 222, in practice, one or more of directory assistance application 224, directory assistance listing database 226, or past business search database 228 may be implemented within front end 222.

Front end 222 may include hardware and/or software components to provide an interface for directory assistance system 220. In one implementation, front end 222 may include a communication or computation device, such as a server computer that may include one or more processors and/or memory devices. In another implementation, front end 222 may include a group of devices either co-located or remotely located to provide the voice-related services. In either implementation, front end 222 may include an interface to receive calls from and provide instructions to network 230.

Directory assistance application 224 may include a set of business rules for providing directory assistance services. For example, directory assistance application 224 may determine what prompts to provide to caller device 210, locate requested information in directory assistance listing database 226, maintain past business search database 228, and/or provide instructions for presenting information to caller device 210 and/or for connecting a call from caller device 210 to a device associated with a business listing.

Directory assistance listing database 226 may include national or local residential and/or business listings. A typical residential or business listing might include the name, address, and/or telephone number of a particular residence or business. A business listing might also include other business-specific information, such as hours of operation, movie listings, directions, a map, etc.

Figure 3:
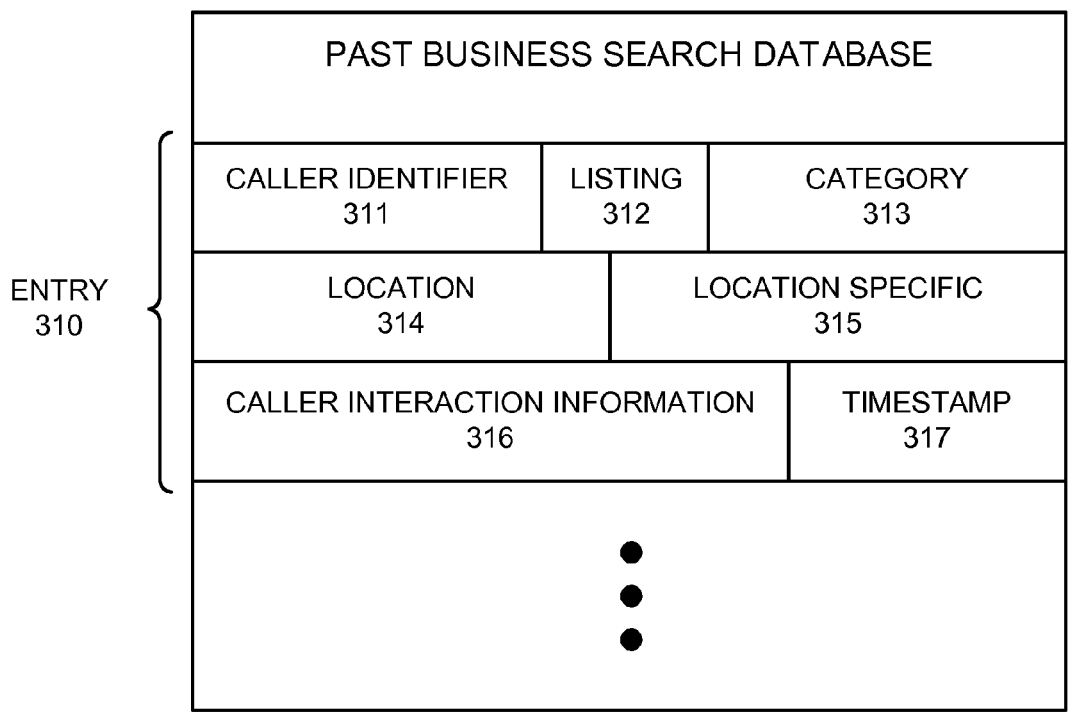
FIG. 3 is an exemplary diagram of the past business search database of FIG. 2.

Past business search database 228 may include information regarding previously requested business listings (also referred to herein as "past business search data"). FIG. 3 is an exemplary diagram of past business search database 228. Past business search database 228 may include a number of entries 310. A single entry 310 is shown in FIG. 3 for simplicity. In one implementation, entry 310 may include caller identifier field 311, listing field 312, category field 313, location field 314, location specific field 315, caller interaction information field 316, and timestamp field 317. In another implementation, entry 310 may include more, fewer, or different fields.

Caller identifier field 311 may include an identifier that identifies the caller or caller device 210, such as a telephone number associated with caller device 210. In one implementation, there may be multiple identifiers associated with a single caller (e.g., when the caller uses multiple, different caller devices to contact directory assistance system 220). Listing field 312 may include the listing requested by the caller. Listing field 312 may include a name, address, and/or telephone number associated with a particular residence or business. Category field 313 may include information regarding a category or another attribute (e.g., four star restaurant, recommended, inexpensive, etc.) associated with the listing identified in listing field 312. For example, if the listing is for Joe's Pizza or Tony's Pharmacy, then category field 313 might include "pizza" or "pharmacy," respectively.

Location field 314 may include the geographic location (i.e., address) associated with the listing identified in listing field 312. Location specific field 315 may indicate whether the listing identified in listing field 312 is associated with a business or residence with a particular geographic location or with no particular geographic location. A local restaurant is an example of a business with a particular geographic location. A "1-800" business is an example of a business with no particular geographic location.

Caller interaction information field 316 may include information regarding the caller's interaction with directory assistance system 220. For example, caller interaction information field 316 may include information regarding what actions the user took during the caller's interaction with directory assistance system 220. For example, the information might indicate whether the user selected a listing when presented with multiple listings, whether the user requested directions to or a map of a location associated with a listing, whether the user requested to be connected to a listing, etc. Caller interaction information field 316 may also include a recording of what the caller said during the caller's interaction with directory assistance system 220. This may be useful when a listing goes by multiple names. For example, the caller may have requested "Joseppi's Pizza," but the listing in directory assistance listing database 226 identifies the business as "Joe's Pizza."

Timestamp field 319 may include information regarding the time (and possibly date) that caller device 210 contacted directory assistance system 220. The information in timestamp field 319 may be used to determine how recent, or old, an entry is. In one implementation, as described below, more recent entries may be favored over less recent entries. Also, older entries may be purged from past business search database 228. For example, when the information in timestamp field 319 indicates that the entry is older than a predetermined time, then the entry may be deleted from past business search database 228.

Returning to FIG. 2, network 230 may include a local area network (LAN), a wide area network (WAN), a telephone network, such as the Public Switched Telephone Network (PSTN) or a cellular network, an intranet, the Internet, or a combination of networks. Caller device 210 and directory assistance system 220 may connect to network 230 via wired and/or wireless connections.

Exemplary Process

Figure 4:
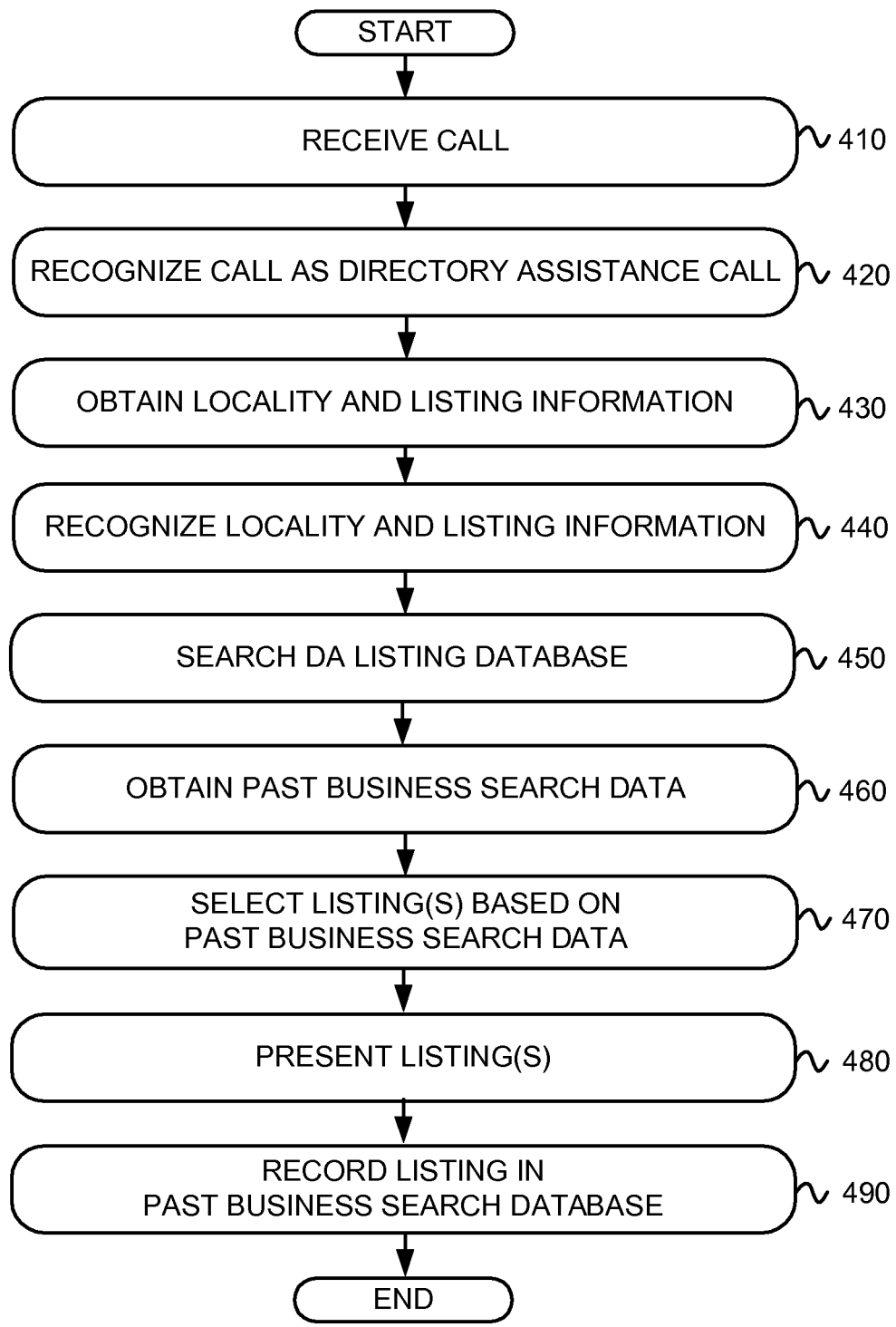
FIG. 4 is a flowchart of an exemplary process for performing a business listing search.

FIG. 4 is a flowchart of an exemplary process for performing a business listing search. The process may be performed by hardware and/or software components on directory assistance system 220, caller device 210, or a combination of directory assistance system 220 and caller device 210.

The process may begin with a caller dialing a telephone number for directory assistance via caller device 210. The call may be routed to front end 222. For example, network 230 may receive the call, recognize it as a directory assistance call based, for example, on the telephone number dialed, and route the call to front end 222. In another implementation, the caller may contact front end 222 in another way, such as via text messaging (e.g., SMS messaging), a web interface, or another communication technique.

The call may be received and recognized as a directory assistance call (blocks 410 and 420). For example, front end 222 may receive the call via network 230. Front end 222 may recognize a directory assistance call based, for example, on the telephone number dialed by the caller. Front end 222 may access and load directory assistance application 224.

Locality and listing information may be obtained from the caller (block 430). For example, directory assistance application 224 may prompt the caller to provide the city and state of the listing the caller desires. Assume that the caller is calling directory assistance to request a listing for Joe's Pizza in Fairfax, Va. In this case, the caller might speak the words "Fairfax, Va." Directory assistance application 224 may also prompt the caller to provide the name of the listing that the caller desires. In response to the prompt, the caller might speak the words "Joe's Pizza." In another implementation, the caller may be permitted to speak a category name or another business attribute instead of a business name. In this example, the caller might speak the word "pizza" or another business attribute that may identify Joe's Pizza.

The locality and listing information may be recognized using a speech recognition technique (block 440). For example, directory assistance application 224 (or another component within or associated with front end 222) may use a speech recognition technique to determine what words were spoken by the caller.

Directory assistance listing database 226 may be searched to identify a listing, or a set of listings, that matches the recognized locality and listing information (block 450). For example, directory assistance application 224 may use the locality information to identify a portion of directory assistance listing database 226 to search. Directory assistance application 224 may use the listing information to identify a particular listing, or a particular set of listings, within the identified portion of directory assistance listing database 226.

Past business search data may be obtained (block 460). For example, directory assistance application 224 may search past business search database 228 to identify one or more entries associated with this caller. In one implementation, directory assistance application 224 may determine whether information associated with the call matches one or more entries of past business search database 228. For example, directory assistance application 224 may determine whether a telephone number associated with caller device 210 matches the information in caller identifier field 311 of an entry in past business search database 228. In this case, directory assistance application 224 may identify one or more entries associated with the caller.

Alternatively, or additionally, directory assistance application 224 may determine whether a listing identified in directory assistance database 226 in connection with the call matches the information in listing field 312 of an entry in past business search database 228. In this case, directory assistance application 224 may identify one or more entries associated with a group of callers who possibly requested the same listing that the caller is requesting.

One or more of the identified listings may be selected based on the past business search data (block 470). For example, directory assistance application 224 may analyze the one or more entries identified in past business search database 228 and use the result of this analysis to select one or more of the identified listings. In one implementation, directory assistance application 224 may weight the identified entries differently. For example, directory assistance application 224 may weight the identified entries based on a measure of recency, frequency, and/or popularity.

With regard to recency, directory assistance application 224 may weight a more recent entry higher than a less recent entry. The measure of recency of an entry may be determined based on the information in timestamp field 317. Weighting more recent entries higher may infer that business searches by the caller that occurred a few minutes ago may include more useful information than business searches that the caller conducted a couple of days ago. In other words, the usefulness of the information associated with a business search may be proportional to how long ago the business search occurred.

With regard to frequency, directory assistance application 224 may weight a more frequent entry higher than a less frequent entry. The measure of frequency of an entry may be determined based on the number of entries that are associated with the same listing and the same caller. Weighting more frequent entries higher may infer that business searches for a particular listing that the caller has performed several times may include more useful information than a business search that the caller performed once. In other words, the usefulness of the information associated with a business search may be proportional to how often the same business search occurred.

With regard to popularity, directory assistance application 224 may weight a more popular entry higher than a less popular entry. The measure of popularity of an entry may be determined based on the number of entries that are associated with the same listing regardless of which caller performed the associated business search. Weighting more recent entries higher may infer that business searches for a particular listing that a lot of callers performed may include more useful information than a business search that only a single caller performed. In other words, the usefulness of the information associated with a business search may be proportional to how many callers performed the same business search.

Additionally, or alternatively, directory assistance application 224 may weight the identified entries based on the information in the different fields of the entries. In one implementation, directory assistance application 224 may weight an entry based on whether the information in category field 313 matches a category associated with the listing the caller is currently seeking. An entry with information in category field 313 that matches the category associated with the listing the caller is currently seeking may be weighted higher than an entry with information in category field 313 that is unrelated to the category associated with the listing the caller is currently seeking.

In another implementation, directory assistance application 224 may also, or alternatively, weight an entry based on whether the information in location specific field 315 indicates that the entry is associated with a listing with no particular geographic location. An entry with information in location specific field 315 that indicates that the entry is associated with a listing with a particular geographic location may be weighted higher than an entry with information in location specific field 315 that indicates that the entry is associated with a listing with no particular geographic location.

In a further implementation, directory assistance application 224 may also, or alternatively, weight an entry based on the information in caller interaction information field 316. For example, an entry with information in caller interaction information field 316 that indicates that the caller placed a call to the listing, obtained directions to the listing, obtained a map that shows a location associated with the listing, selected the listing from a set of presented listings, or otherwise expressed an interest in the listing may be weighted higher than an entry with information in caller interaction information field 316 that indicates that the caller did not place a call to the listing, did not obtain directions to the listing, did not obtain a map that shows a location associated with the listing, did not select the listing from a set of presented listings, or did not otherwise express an interest in the listing.

Directory assistance application 224 may process the information in the identified one or more entries, as weighted above, to select one or more of the identified listings. The amount of influence that a particular entry provides in the selection process may be directly proportional to its weight. In one implementation, the weight assigned to an entry may be one or zero (i.e., the entry is either used in the selection process or it is not). In another implementation, the weight assigned to an entry may vary between upper and lower limits (e.g., between zero and one, between one and one hundred, etc.).

In one implementation, directory assistance application 224 may select one or more of the identified listings as a function of the geographic location of the listing(s) relative to the geographic location in location field 314 of the identified one or more entries and the weights assigned to the identified one or more entries. If the caller previously requested a listing for Sam's Hardware store and five minutes later calls for Joe's Pizza, the entry associated with the previous request (i.e., Sam's Hardware store) can be used to select a listing for the current call. For example, suppose that there are four Joe's Pizzas that match the caller's request. The Joe's Pizzas may be scored based on their geographic distance from Sam's Hardware store.

The selected listing(s) may be presented to the caller (block 480). In one implementation, directory assistance application 224 may present the highest scoring listing to the caller (e.g., the Bagel Shop near the pharmacy recently requested). In another implementation, directory assistance application 224 may order the selected listings based on their scores and present an ordered list of the selected listings to the caller (e.g., a list of coffee shops ordered by their proximity to the hardware store recently requested). In this case, the caller may be permitted to choose one of the listings in the ordered list. In yet another implementation, directory assistance application 224 may prompt the caller whether the caller desires a listing geographically near an earlier-requested listing prior to presenting any of the listings. If the caller indicates a desire for such a listing, then directory assistance application 224 may present the highest scoring listing or an ordered list of listings, as described above. If the caller indicates no desire for such a listing, then directory assistance application 224 may present a listing with no regard to the past business search data.

The particular presentation method used may be based on business considerations. Alternatively, the particular presentation method used may be based on confidence levels. For example, the first presentation method (i.e., presenting highest scoring listing) may be used when the confidence level that directory assistance application 224 has identified the listing desired by the caller is above a predetermined threshold. The second presentation method (i.e., presenting an ordered list of the selected listings) or the third presentation method (i.e., prompting the caller) may be used when the confidence level that directory assistance application 224 has identified the listing desired by the caller is not above the predetermined threshold.

The listing presented to the caller may be recorded in past business search database 228 (block 490). For example, directory assistance application 224 may create an entry in past business search database 228 and populate the entry with information regarding the listing and the caller's interaction with directory assistance application 224. In one implementation, directory assistance application 224 may create an entry in past business search database 228 only when the caller performs a particular action, such as when the caller requests to be connected to a device associated with the listing or when the caller requests directions to or a map of a location associated with the listing.

While the preceding description described a selection block (block 470) and a presentation block (block 480) that can be based on past business search data (i.e., information regarding one or more previously requested business listings), this need not be the case. In another implementation, the selection block alone may be based on the past business search data. In yet another implementation, the presentation block alone may be based on the past business search data.

The interaction described above may be accomplished via audio data, visual data, or a combination of audio data and visual data (sometimes referred to as "multimodal" data). The interaction with the caller may be a single interaction (e.g., the caller provides locality and listing information and receives the desired listing) or multiple interactions (e.g., the caller may be prompted one or more times for clarification, instruction, and/or selection.

Location-Specific Adjustments

As described above, listing information that a caller has requested in the past has location information that might be relevant when selecting and/or presenting a current listing to the caller. The location information may also be used in other ways. For example, location information from a previously-requested listing may be used to approximate a present or future location of the caller. For example, assume that the caller requests a listing for Sam's Hardware store at 1234 Miller Lane in Fairfax, Va., and then ten minutes later calls back for a listing for a pharmacy. The caller's present or future location may be approximated to be 1234 Miller Lane in Fairfax, Va., assuming that the caller is going to Sam's Hardware store for which the caller previously requested the listing.

Alternatively, the caller's location may be approximated based on location information associated with a group of previously requested listings. For example, if the caller had previously requested listings in geographical areas A, B, and C, then listings within these geographical areas may be scored higher than listings outside these geographical areas.

In one implementation, the caller's approximated location may be used to populate a mapping function, thereby avoiding the need for the caller to provide his current location. For example, directory assistance application 224 may use the approximated location to populate a "starting location" field and location information associated with the requested listing to populate an "ending location" field of a mapping function. The approximated location may be as specific as the specific address of the previously requested listing or as general as the district, city, county, town, etc. of the previously requested listing. Alternatively, location information from a group of previously requested listings may be offered to the caller as potential locations for the caller (e.g., to populate the "starting location" field of the mapping function). Based on the populated starting and ending locations, directory assistance application 224 may provide the caller with directions from the previously requested listing to the currently requested listing and/or a map that shows locations associated with the previously requested listing and the currently requested listing.

In another implementation, the caller's approximated location may be used in scoring listings from directory assistance database 226. For example, directory assistance application 224 may score listings from directory assistance database 226 that appear to match the caller's current request with locations in an area including the caller's approximated location higher than listings in other areas of the locality provided by the caller.

In yet another implementation, the caller's approximated location may be used to direct advertisements to the caller. For example, advertisements for businesses near the caller's approximated location may be presented to the caller. In one implementation, these advertisements might include coupons to be used at the businesses.

In some respects, using location information from one or more previously requested listings, as described above, competes with caller location identification techniques, such as global positioning system (GPS) techniques, tower triangularization techniques, or user location inputting techniques. In other respects, using location information from one or more previously requested listings supplements caller location identification techniques. For example, a caller might be interested in a listing near her present location, near the location of a previously requested listing, or along the path from the caller's present location to the location of the previously requested listing. In one implementation, it may be determined, using a caller location identification technique, whether the caller is moving in a direction toward a location of a previously requested listing. In this case, listings located along the path toward or near the location of the previously requested listing may be scored higher than other listings.

Example

Figure 5:
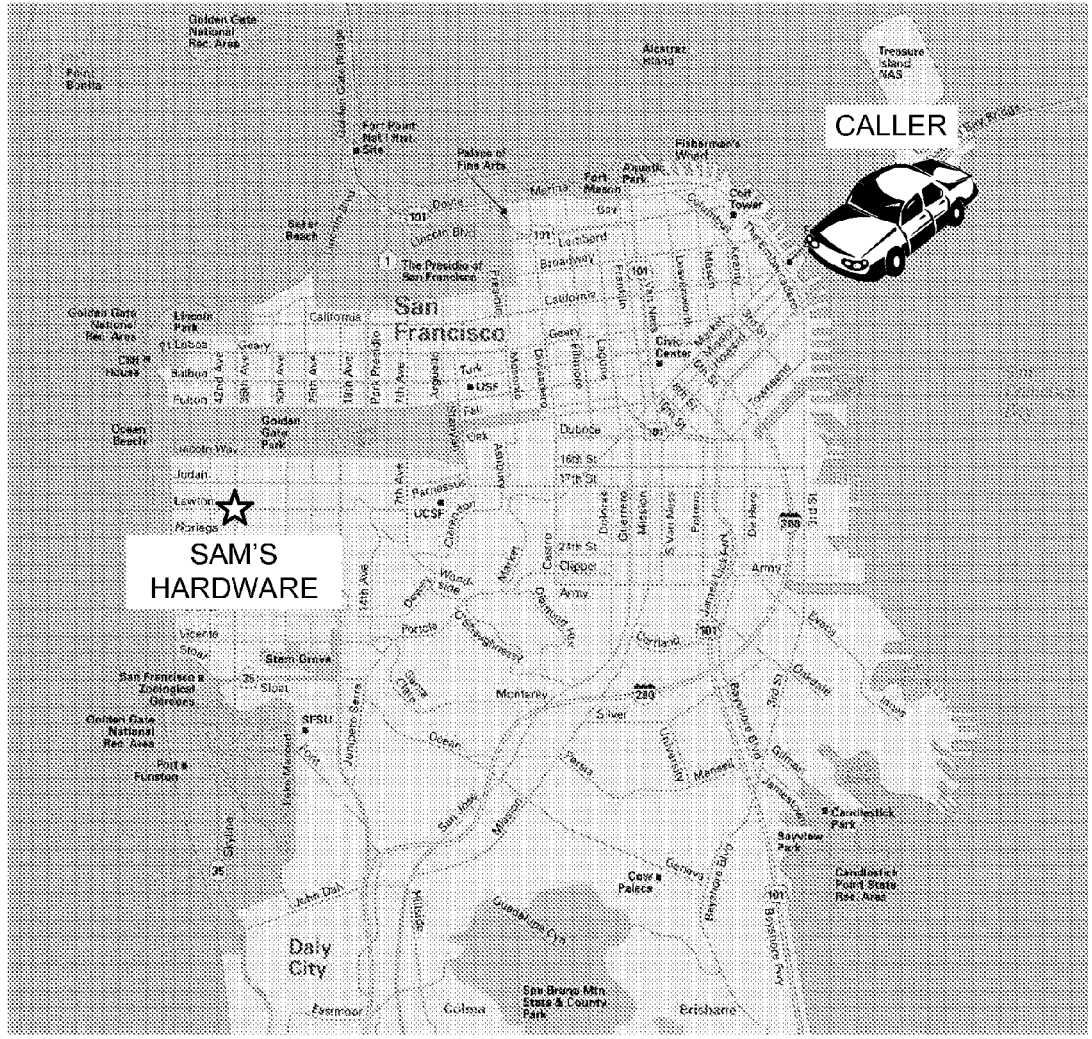
FIGS. 5-9 are diagrams illustrating examples for obtaining listing information.
Figure 6:
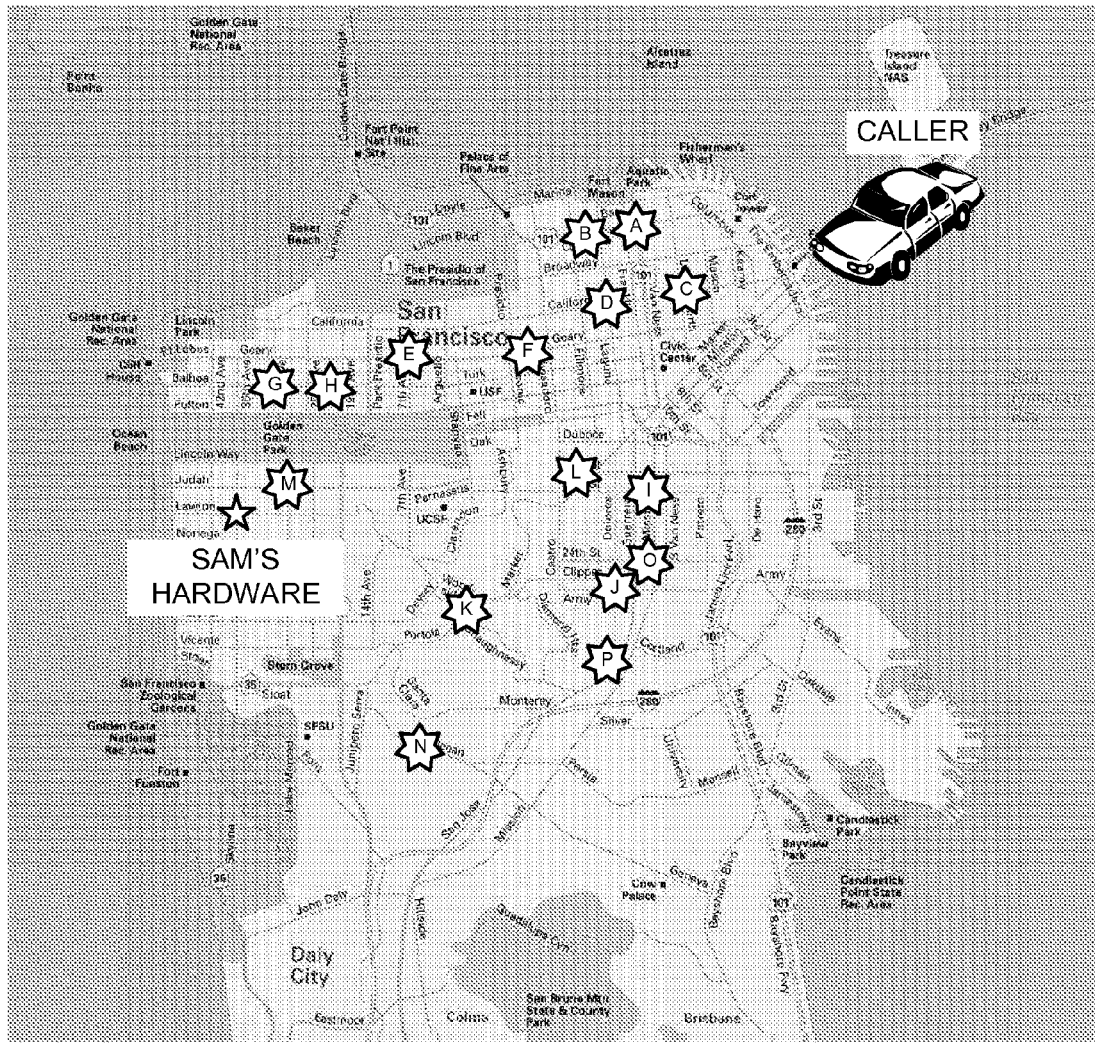

As described above, data associated with past business searches may be used to influence the selection and/or presentation of a listing to a caller. FIGS. 5-9 are diagrams illustrating examples for obtaining listing information. Assume that a caller contacts directory assistance for the first time to request a listing for Sam's Hardware store in San Francisco, Calif., as shown in FIG. 5. The caller may provide locality information ("San Francisco" or "San Francisco Calif.") and listing information ("Sam's Hardware"). Directory assistance application 224 may provide the caller with a listing for Sam's Hardware. Directory assistance application 224 may also record the listing and other information regarding the caller's interaction with directory assistance in past business search database 228.

Assume that five minutes later, the caller contacts directory assistance again to request a listing for Carly's Coffee House. Assume that Carly's Coffee House has many locations in San Francisco, as shown as locations A-P in FIG. 6. Directory assistance application 224 may identify the Carly's Coffee House locations as possible candidates to satisfy the caller's request. Alternatively, the caller could have requested the category "coffee shops" and directory assistance application 224 may have identified coffee shops within San Francisco as possible candidates to satisfy the caller's request.

Figure 7:
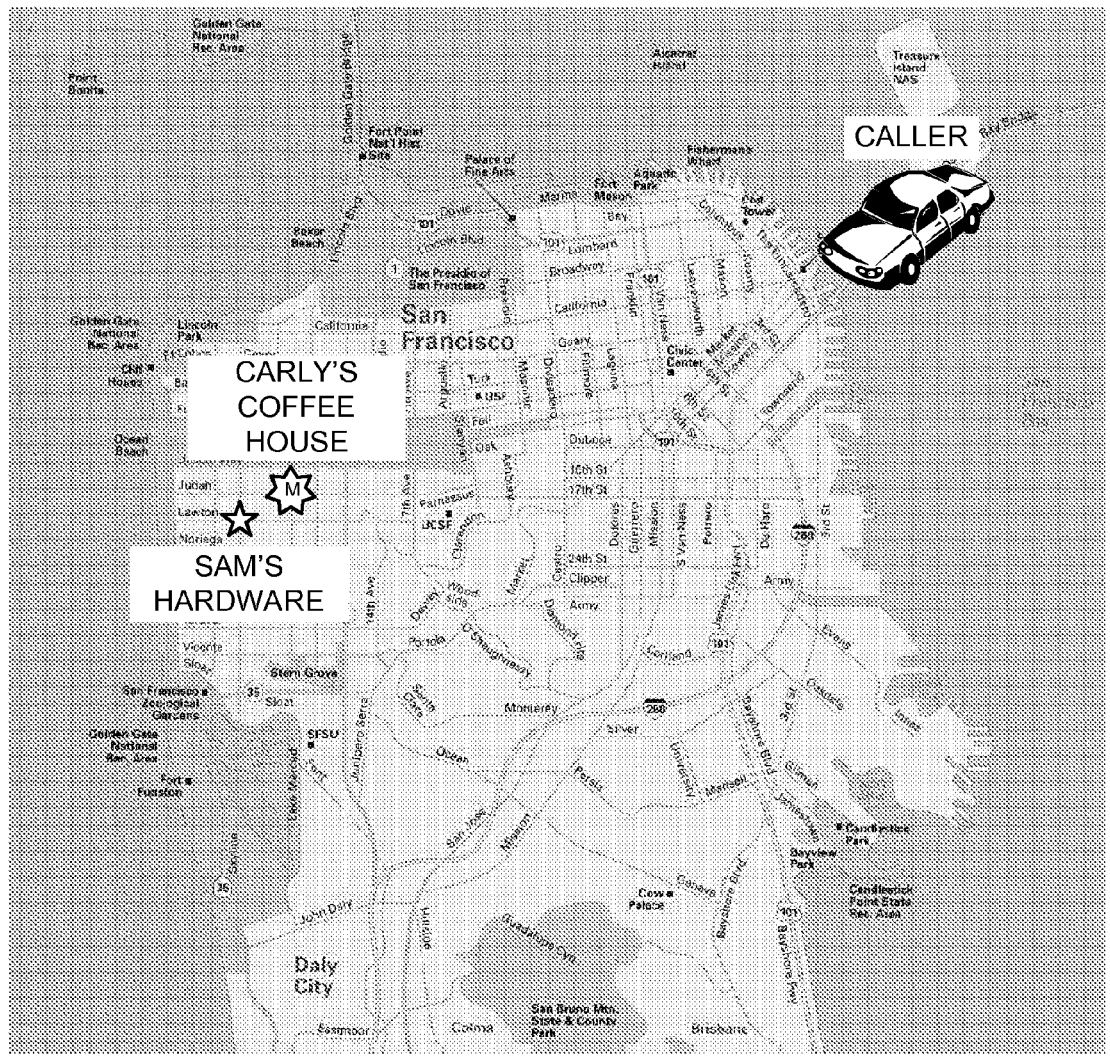

Because the caller had previously requested a listing for Sam's Hardware store, directory assistance application 224 may weight the candidates based on their distance from the location of Sam's Hardware store. In one implementation, directory assistance application 224 may select and present the listing for Carly's Coffee House at location M, because it is closest to the location of Sam's Hardware store, as shown in FIG. 7. In another implementation, directory assistance application 224 may select and present an ordered list of listings for Carly's Coffee House based on their relative distance from the location of Sam's Hardware store.

Figure 8:
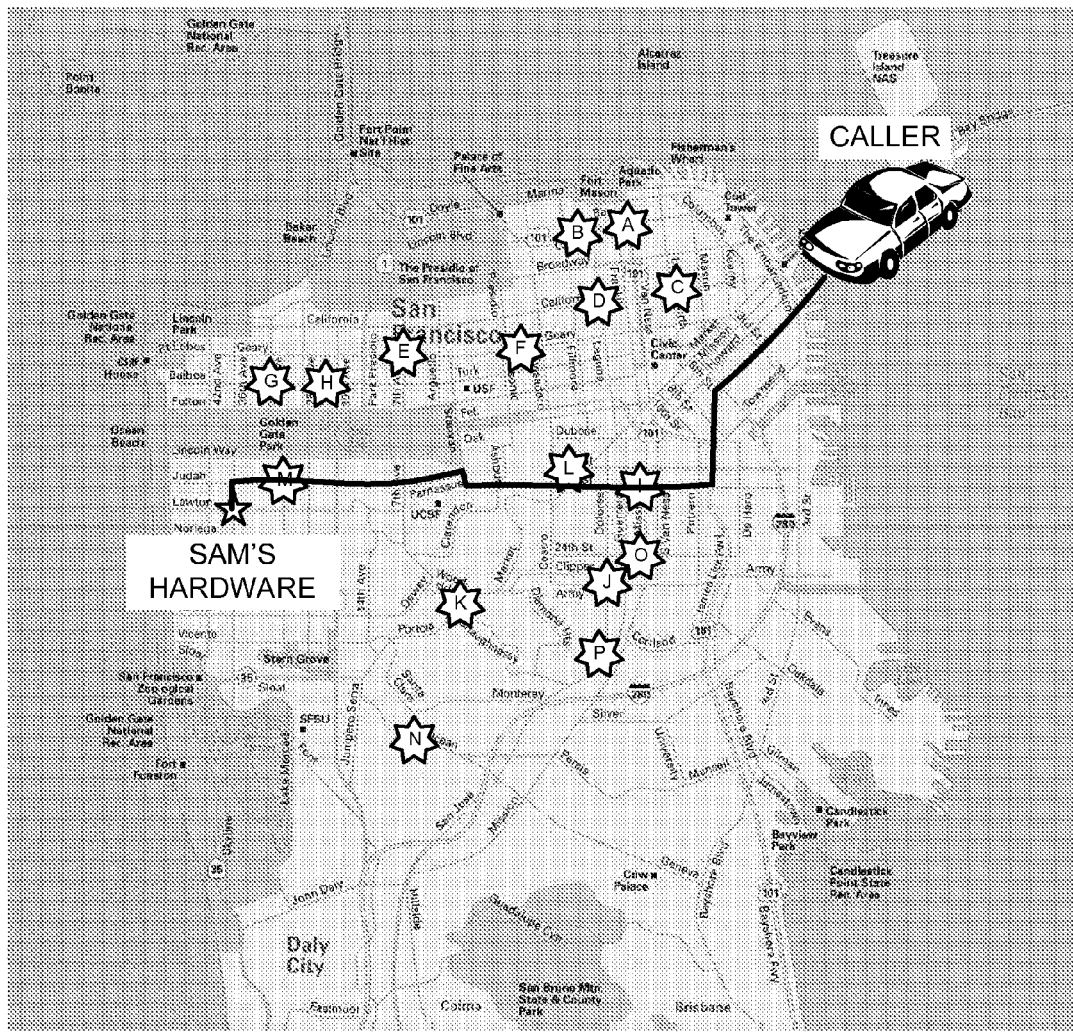
Figure 9:
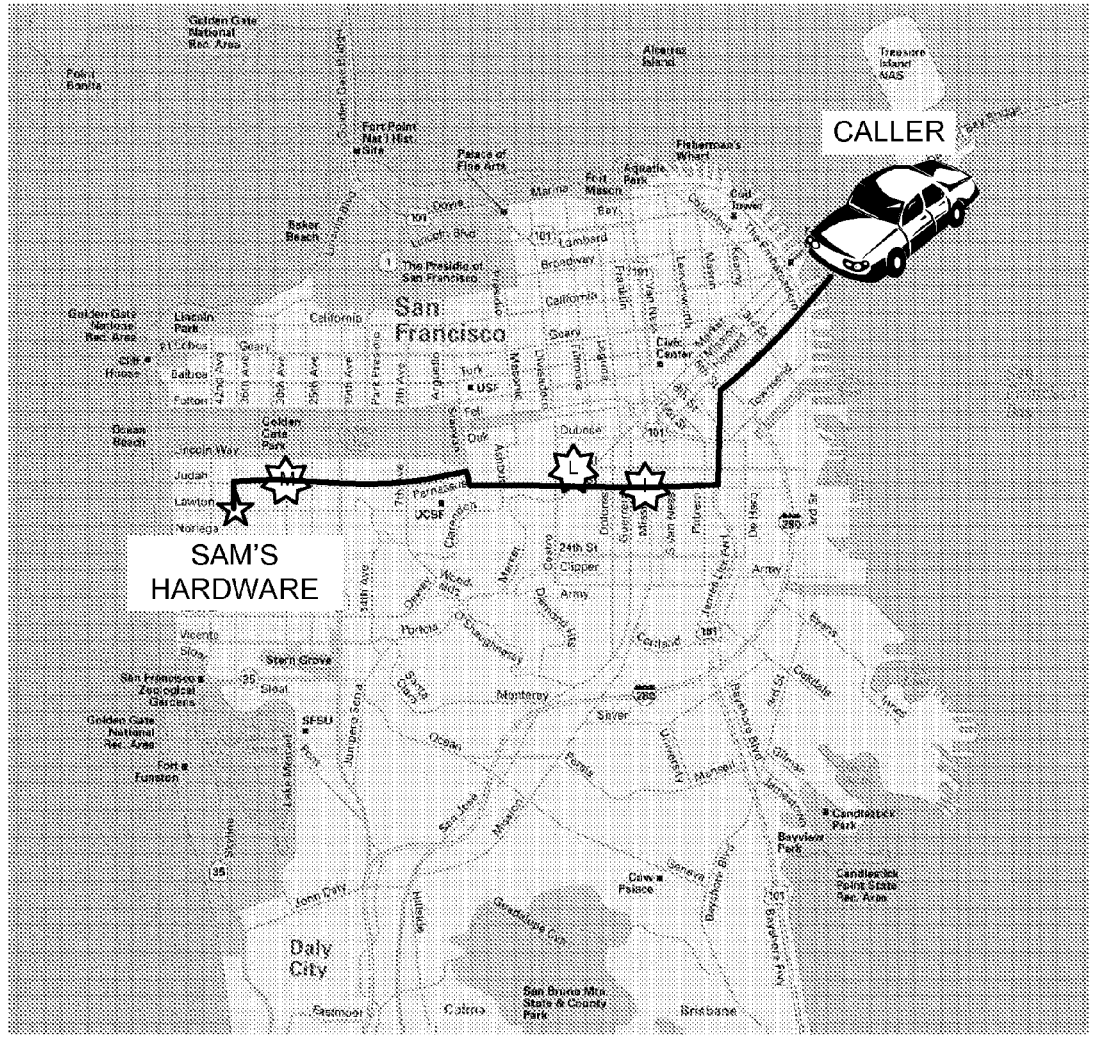

Assume that directory assistance application 224 can determine the caller's current location using, for example, a caller location identification technique (e.g., a GPS technique). Assume also that directory assistance application 224 can determine the caller's travel path based on prior directions provided to the caller to Sam's Hardware store or using the caller location identification technique, as shown in FIG. 8. In this case, directory assistance application 224 may select and present an ordered list of listings for Carly's Coffee House based on the caller's current location and/or travel path. For example, directory assistance application 224 may weight the candidates based on their proximity to the caller's current location and/or the caller's travel path. In this case, directory assistance application 224 may provide an ordered list of listings for Carly's Coffee House (e.g., at locations I, L, and M, but not necessarily in this order) based on the caller's current location and/or travel path, as shown in FIG. 9.

CONCLUSION

Implementations described herein may assist in selecting and/or presenting business search results based on location information associated with prior business search results. Alternatively, the implementations described herein may assist in selecting and/or presenting business search results based on location information associated with prior residential search results.

The foregoing description of embodiments provides illustration and description, but is not intended to be exhaustive or to limit the embodiments to the precise form disclosed. Modifications and variations are possible in light of the above teachings or may be acquired from practice of the invention.

For example, while a series of acts has been described with regard to FIG. 4, the order of the acts may be modified in other implementations. Further, non-dependent acts may be performed in parallel.

Also, the term "caller" has been used herein. The term "caller" is intended to be broadly interpreted to include a caller device or a user of a caller device.

Further, certain information has been described as being stored by directory assistance system 220 and certain functions have been described as being performed by directory assistance system 220. In other implementations, at least some of this information may be stored by caller device 210 and at least some these functions may be performed by caller device 210. For example, the past business search data associated with a caller may be stored by caller device 210. Also, the analysis of the past business search data may be performed at caller device 210.

In one alternative implementation, a caller may be permitted to specify criteria for how the caller's previously requested business listings are used. For example, directory assistance system 220 may maintain a user profile for the caller. The user profile may specify how long entries remain valid, whether to present just a high scoring business listing or a list of high scoring business listings, whether this feature (i.e., the feature of using previously requested business listings to influence the selection and/or presentation of future business listings) should be turned on or off, or other criteria that may influence how previously requested business listings are used.

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, from a caller, a request for a business listing;
    wherein a database includes business listings including previously requested business listings that have been requested by the caller;
    wherein the previously requested listings are weighted; and
    wherein a higher weight is assigned to a more recently requested one of the previously requested business listings than a less recently requested one of the previously requested business listings;
    identifying a set of business listings based on the request;
    determining a geographic location associated with a previously requested business listing, which was requested by the same caller;
    approximating a location of the caller from which the request is received based on the geographic location associated with the previously requested business listing;
    selecting one of the business listings in the set of business listings based on a geographic location associated with the previously requested business listing and the weights assigned to the previously requested business listings;
    providing a map that illustrates a geographic location associated with the selected business listing; and
    providing coupons to the caller to be used at the selected business listing based on the location of the caller.

2. The method of claim 1, wherein receiving the request for the business listing includes:
    receiving, from the caller, a call for directory assistance, and
    interacting with the caller to determine the business listing requested by the caller.

3. The method of claim 2, wherein the interacting with the caller includes:
    receiving locality and listing information from the caller.

4. The method of claim 1, further comprising:
    maintaining the database of the business listings including the previously requested business listings.

5. The method of claim 1, further comprising:
    weighting some of the previously requested business listings based on a measure of frequency of request of the previously requested business listings; wherein, the selected business listing is identified based further in part on measure of frequency of request.

6. The method of claim 1, further comprising:
    further weighting some of the previously requested business listings based on a measure of popularity.

7. The method of claim 6, wherein, the selected business listing is identified based further in part on measure of frequency of request.

8. The method of claim 5, wherein weighting the some of the previously requested business listings includes:
    assigning a higher weight to one of the previously requested business listings that has been requested more frequently by the caller than another one of the previously requested business listings that has been requested less frequently by the caller.

9. The method of claim 6, wherein weighting the some of the previously requested business listings includes:
    assigning a higher weight to previously requested business listings that have been requested by more callers than other previously requested business listings that have been requested by a fewer number of callers.

10. The method of claim 4, further comprising:
    weighting each of a group of the previously requested business listings based on whether the previously requested business listing is associated with no particular geographic location or based on interaction with a caller in obtaining the previously requested business listing.

11. The method of claim 1, wherein selecting the one of the business listings further includes selecting multiple business listings in the set of business listings as candidate business listings.

12. The method of claim 11,
    including providing one of the candidate business listings that is associated with a geographic location that is closest in distance to the geographic location associated with the one previously requested business listing.

13. The method of claim 11,
including providing a list of the candidate business listings in an order based on geographic locations associated with the candidate business listings relative to the geographic location associated with the one previously requested business listing.

14. The method of claim 11,
including prompting a caller as to whether the caller desires one of the candidate business listings that is associated with another geographic location that is close in distance to the geographic location associated with the one previously requested business listing.

15. The method of claim 1, further comprising:
providing directions based on the selected business listing and the geographic location associated with the caller.

16. The method of claim 15, wherein the providing the directions includes:
identifying a starting location based on the geographic location associated with the one previously requested business listing,
identifying an ending location based on a geographic location associated with the selected business listing, and
obtaining the directions based on the starting location and the ending location.

17. The method of claim 1, further comprising:
determining a current location of a user from which the request is received; and
wherein the selecting the one of the business listings includes identifying one of the business listings based on the current location of the user and the geographic location associated with the one previously requested business listing.

18. The method of claim 1, further comprising:
providing directions with regard to the geographic location associated with the one previously requested business listing; and
wherein selecting the one of the business listings includes identifying one of the business listings based on the directions.

19. The method of claim 1, wherein receiving the request for the business listing includes receiving a request for an attribute of a business for which a business listing is desired.

20. A method, comprising:
maintaining a database of previously requested business listings;
assigning weights to the previously requested business listings, wherein, the assigning of the weights includes:
assigning a higher weight to a more recent one of the previously requested business listings than a less recent one of the previously requested business listings;
weighting some of the previously requested business listings based on a measure of frequency of request of the previously requested business listings;
receiving, from a caller, a request for a business listing;
identifying a set of business listings based on the request;
determining a geographic location associated with a previously requested business listing, which was requested by the same caller;
approximating a location of the caller from which the request is received based on the geographic location associated with the previously requested business listing;
selecting one of the business listings in the set of business listings based on a geographic location associated with the previously requested business listing and the weights assigned to the previously requested business listings;
providing a map that illustrates a geographic location associated with the selected business listing; and
providing coupons to the caller to be used at the selected business listing based on the location of the caller.

21. The method of claim 20, wherein the request is received in a call for directory assistance, and interacting with the caller to determine the business listing requested by the caller.

22. The method of claim 21, wherein the interacting with the caller includes: receiving locality and listing information from the caller.

23. The method of claim 20, further comprising:
weighting each of a group of the previously requested business listings in the database based on whether the previously requested business listing is associated with no particular geographic location or based on interaction with a caller in obtaining the previously requested business listing.

24. The method of claim 20, further comprising,
identifying one or more of the previously requested business listings in the database that corresponds to the caller from which the request is received.

25. The method of claim 20, further comprising: assigning the weights to the previously requested business listings in the database based further in part on a measure of popularity.

26. The method of claim 20, further comprising:
assigning a higher weight to one of the previously requested business listings that has been requested more frequently by a particular caller than another one of the previously requested business listings that has been requested less frequently by the particular caller.

27. The method of claim 25, further comprising:
assigning a higher weight to one of the previously requested business listings that has been requested by a greater number of callers than another one of the previously requested business listings that has been requested by a fewer number of callers.

28. The method of claim 23, further comprising:
providing one or more of the business listings based on a geographic location associated with one or more of the weighted, previously requested business listings.

29. The method of claim 20, including providing one of the business listings that is associated with a geographic location that is closest in distance to the geographic location associated with the one previously requested business listing.

30. The method of claim 20, including providing a list of the business listings in an order based on geographic locations associated with the business listings relative to the geographic location associated with the one previously requested business listing.

31. The method of claim 20, including prompting a caller as to whether the caller desires one of the business listings that is associated with a geographic location that is close in distance to the geographic location associated with the one previously requested business listing.

32. The method of claim 20, further comprising:
providing directions based on the one previously requested business listing and the selected business listings.

33. The method of claim 32, wherein providing the directions includes:
identifying a starting location based on the geographic location associated with the one previously requested business listing,
identifying an ending location based on a geographic location associated with the presented the business listing, and
obtaining the directions based on the starting location and the ending location.

34. The method of claim 20, further comprising:
determining an approximate location of a caller from which the request is received based on the geographic location associated with the one previously requested business listing.

35. The method of claim 34, including:
assigning scores to the business listings based on geographic locations associated with the business listings relative to the approximated location of the caller, and
selecting one of the business listings to present based on the scores.

36. The method of claim 34, further comprising: providing advertisements to the caller based on the approximate location of the caller.

37. A system implemented within at least one of a directory assistance device or a caller device, comprising:
means for receiving, from a caller, a request for a business listing;
wherein, in a database, the business listings include previously requested business listings that have been requested by the caller, wherein, the previously requested listings are weighted;
further wherein in the database, a higher weight is assigned to a more recently requested one of the previously requested business listings than a less recently requested one of the previously requested business listings;
means for identifying a set of business listings based on the request;
means for determining a geographic location associated with a previously requested business listing, which was requested by the same caller;
means for, approximating a location of the caller from which the request is received based on the geographic location associated with the previously requested business listing;
means for selecting one of the business listings in the set of business listings based on a geographic location associated with the previously requested business listing and the weights assigned to the previously requested business listings;
means for, providing a map that illustrates a geographic location associated with the selected business listing;
means for, providing coupons to the caller to be used at the selected business listing based on the location of the caller.

* * * * *